May 11, 1948. M. T. MASURE 2,441,429
ANTISKID DEVICE
Filed April 26, 1945
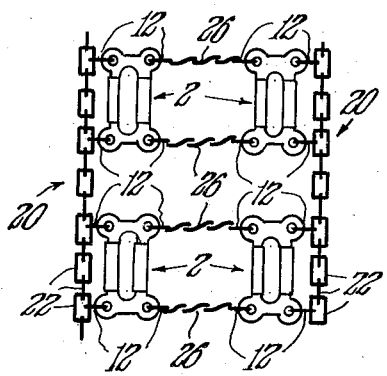
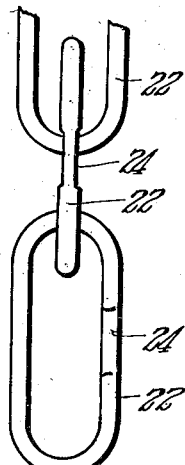
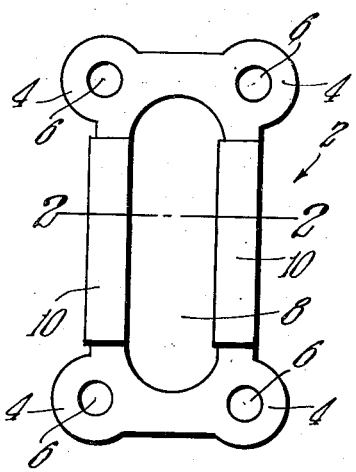
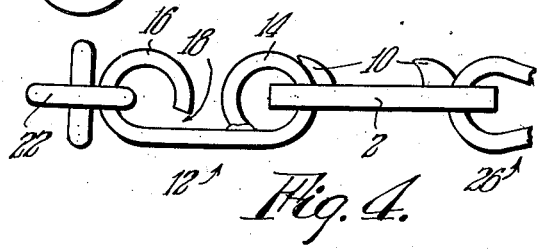
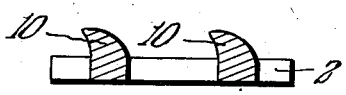
INVENTOR.
Myrle T. Masure.
BY Walter C. Ross.
Attorney.

Patented May 11, 1948

2,441,429

UNITED STATES PATENT OFFICE 2,441,429

ANTISKID DEVICE

Myrle T. Masure, Feeding Hills, Mass.

Application April 26, 1945, Serial No. 590,380

1 Claim. (Cl. 152—243)

This invention relates to improvements in anti-skid devices and is directed more particularly to anti-skid chains for vehicle tires.

The principal objects of the invention are directed to the provision of an anti-skid plate and tire chain combination which has the ability to come into play when the vehicle tends to skid and is adapted to prevent skidding.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a plan view of an anti-skid plate embodying the novel features of the invention;

Fig. 2 is a sectional elevational view on the line 2—2 of Fig. 1;

Fig. 3 is a plan view of links for forming a side chain;

Fig. 4 is an end elevational view of the plate shown in Figs. 1 and 2 associated with a side chain;

Fig. 5 is a small scale diagrammatic view showing plates of the invention embodied in a tire chain; and Fig. 6 is a diagrammatic view showing the anti-skid plates as they are located on the peripheral surface of a tire.

Referring now to the drawings in detail, the invention will be fully described.

An anti-skid plate is shown at 2 which is provided with ears 4 on opposite corners thereof that have openings 6 therein for links. The plate 2 is provided with a longitudinal opening 8 and a pair of similar longitudinal extending knife-like blades 10. These extend upwardly and outwardly in spaced relation as clearly shown in Fig. 2.

A plurality of the plates 2 are used in a tire chain and hook members 12 have eyes 14 in the openings 6 of the plates. The outer ends of the members 12 are formed with eyes 16 in such a way as to provide slots 18 leading thereinto as shown in Fig. 4. Side chains 20 may have interconnected links 22, as shown in Fig. 3, and these may have flattened portions indicated by 24 which are adapted to pass through the slots 18. Cross chains 26 are similarly connected at opposite ends to the openings 6 at adjacent inner sides of the plate 2.

The side chains 20 may take any form desired but the form of links shown in Figs. 3 and 4 are suitable for the practice of the invention.

In another way, plates such as 2 and cross chains may be associated with straps adapted to pass through a vehicle wheel in lieu of being associated with side chains such as 20.

The plates 2 with the side chains and cross chains are so assembled and arranged that the plates 2 are positioned on the periphery of a tire T at opposite sides thereof. In this way, the gripping elements on the plates 2 extend circumferentially of the tire and outwardly. There are pairs of elements on either side of the tire with the elements of each pair spaced apart and the elements of one pair extending in a direction opposite to that of the other pair. The elements are of such form and so located as to bite into the roadway when there is a tendency of the tire skidding thereon.

The plates 2 may be made of any material desired and may be treated to obtain the desired hardness and wearing qualities and the same is true of the cross chains and side chains, all to the end that skidding is prevented while at the same time the construction is adapted for long life.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim are therefore intended to be embraced therein.

What it is desired to claim and secure by Letters Patent of the United States is:

The combination of side chains for extending circumferentially around a tire in transversely spaced relation with an anti-skid construction disposed therebetween comprising, a substantially rectangular plate member adjacent the inner side of each side chain, each having transversely spaced longitudinal side members connected at opposite ends by transverse end members, said plates provided with spaced openings at opposite ends thereof, hooks engaging and connecting the openings at outer opposite ends of the plates adjacent the side chains to said side chains, and cross chains engaging and connecting the openings at inner opposite ends of said plates whereby said plates are held by said hooks and cross-chains in transversely spaced relation and between said side chains with the side members of said plates in parallelism with said side chains, the opposite side faces of each side member of the plates extending vertically upwardly and having upper portions curving upwardly and outwardly from the vertical planes of said side faces in the same general direction, the said upper portions of the side faces of each side member curving into merging relation to provide a sharpened longitudinal ridge disposed above the upper face of the plate and at a distance outwardly from a side face, the ridges of each plate being disposed outwardly from certain corresponding side faces and in parallelism with the side chains and the said certain side faces being the outermost faces of the side members of said plates and adjacent said side chains whereby with the side chains extending around a tire the ridges extend circumferentially thereof.

MYRLE T. MASURE.

REFERENCES CITED

The following references are of record in the file of this patent:

UNITED STATES PATENTS

| Number | Name | Date |
|---|---|---|
| 1,270,550 | Boling | June 25, 1918 |
| 1,416,806 | Fichten | May 23, 1922 |
| 1,584,651 | Riggle | May 11, 1926 |
| 1,617,034 | Stanley | Feb. 8, 1927 |
| 1,763,998 | Allmon | June 17, 1930 |
| 2,122,967 | Theis | July 5, 1938 |
| 2,311,116 | Lau | Feb. 16, 1943 |